United States Patent
Ringk

(10) Patent No.: US 11,329,339 B2
(45) Date of Patent: May 10, 2022

(54) METHOD FOR MANUFACTURING A BATTERY CELL WITH AN OXYGEN DIFFUSION BARRIER LAYER

(71) Applicant: Robert Bosch GmbH, Stuttgart (DE)

(72) Inventor: Andreas Ringk, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 16/401,161

(22) Filed: May 2, 2019

(65) Prior Publication Data
US 2019/0341583 A1    Nov. 7, 2019

(30) Foreign Application Priority Data

May 3, 2018 (DE) ...................... 10 2018 206 798.8

(51) Int. Cl.
| | |
|---|---|
| *H01M 50/116* | (2021.01) |
| *H01M 50/193* | (2021.01) |
| *H01M 50/186* | (2021.01) |
| *H01M 10/0525* | (2010.01) |
| *H01M 50/572* | (2021.01) |
| *H01M 50/141* | (2021.01) |

(52) U.S. Cl.
CPC ..... *H01M 50/193* (2021.01); *H01M 10/0525* (2013.01); *H01M 50/116* (2021.01); *H01M 50/186* (2021.01); *H01M 50/572* (2021.01); *H01M 50/141* (2021.01)

(58) Field of Classification Search
CPC . H01M 2/02–0292; H01M 2/04–0495; H01M 2/06–08; H01M 10/04–054; H01M 50/10–11; H01M 50/50; H01M 50/116–198; H01M 50/528–529; H01M 50/543–572
See application file for complete search history.

(56) References Cited

U.S. PATENT DOCUMENTS

| | | | | |
|---|---|---|---|---|
| 6,006,763 | A  * | 12/1999 | Mori ........................ | B08B 3/10 |
| | | | | 134/1.1 |
| 6,190,436 | B1 * | 2/2001 | Ji ........................... | B01D 63/02 |
| | | | | 95/45 |

(Continued)

FOREIGN PATENT DOCUMENTS

| | | |
|---|---|---|
| DE | 69728092 T2 | 1/2005 |
| DE | 102015225705 A1 | 6/2017 |
| JP | 2001068072 | 3/2001 |

*Primary Examiner* — Jonathan Crepeau
*Assistant Examiner* — Jacob Buchanan
(74) *Attorney, Agent, or Firm* — Michael Best & Friedrich LLP

(57) ABSTRACT

A method for manufacturing a battery cell (1) and a battery cell (1) comprises providing a battery housing (3) and introducing electrodes (5) and an electrolyte (9) into the battery housing (3). At least partial regions (23) of a surface, in particular an outer surface, of the battery housing (3) are coated with a diffusion barrier layer (25) made of a polymer material (27) and then the polymer material (27) of the diffusion barrier layer (25) is oxidized at least on the surface to form an oxide layer (29). The polymer material (27) may be in particular silicone so that the oxide layer (29) consists of silicon dioxide. An oxide layer (29) thus generated increases a barrier effect of the diffusion barrier layer (25) considerably and may be generated using technically simple means, such as for example an atmospheric pressure plasma.

17 Claims, 2 Drawing Sheets

(56) References Cited

U.S. PATENT DOCUMENTS

| | | | |
|---|---|---|---|
| 8,501,636 B1* | 8/2013 | Wang | H01L 21/02337 |
| | | | 438/787 |
| 2003/0129487 A1* | 7/2003 | Inoue | H01M 50/133 |
| | | | 429/129 |
| 2004/0029001 A1* | 2/2004 | Yamazaki | H01M 50/116 |
| | | | 429/176 |
| 2010/0151274 A1 | 6/2010 | Kang et al. | |
| 2011/0164347 A1* | 7/2011 | Aitchison | H01G 11/74 |
| | | | 174/50.54 |
| 2015/0311494 A1* | 10/2015 | Baker | C23C 14/34 |
| | | | 216/13 |
| 2016/0126509 A1* | 5/2016 | Gayden | H01M 50/116 |
| | | | 29/623.5 |
| 2017/0179450 A1* | 6/2017 | Dirscherl | H01M 2/0287 |

* cited by examiner

METHOD FOR MANUFACTURING A BATTERY CELL WITH AN OXYGEN DIFFUSION BARRIER LAYER

BACKGROUND OF THE INVENTION

The invention relates to a method for manufacturing a battery cell, in particular a lithium ion battery cell, and to a battery cell which can be manufactured correspondingly.

Battery cells serve to supply electrical consuming devices with electrical energy. Rechargeable battery cells, which are also designated as accumulators, may be used in small appliances, such as for example laptops or mobile telephones, but also, for example, in electrically driven vehicles.

In principle battery cells have electrodes which are covered with an active material and an electrolyte is stored temporarily between them. The said components are usually accommodated in a battery housing in order to protect them in particular from chemical and mechanical influences. In order to be able to supply the electrical energy being released at the electrodes due to chemical reactions to a consuming device, connection terminals, which form poles of the battery cell, are usually passed from the interior of the battery cell through openings in its battery housing to the outside. The openings in the housing must thus be sealed to be hermetically tight adjacent the connection terminals in order to be able to prevent penetration, for example of moisture, since this could lead to critical chemical reactions in the interior of the battery cell.

Generally, it should also be avoided in most battery cells that oxygen reaches the interior of the battery cell, since there it may damage components, such as for example the active material, due to chemical reactions. In order to achieve this, particular sealing measures are required, since it has been observed that oxygen may diffuse through some sealing components or sealing layers used for other sealing purposes.

JP 2001 068072 describes, for example, a battery cell in which a silicon dioxide layer is used as a diffusion barrier to inward diffusion of oxygen.

SUMMARY OF THE INVENTION

Against this background, a method for manufacturing a battery cell and a battery cell which can be manufactured correspondingly are put forward according to the independent claims with the approach put forward here. Advantageous developments and improvements of the approach put forward here can be seen from the description and are defined in the dependent claims.

Embodiments of the present invention may advantageously facilitate manufacture of a battery cell, in particular a lithium ion battery cell, in a simple manner and one which can be converted to an industrial scale and thus impart to the battery cell properties which largely prevent penetration, in particular inward diffusion, of oxygen into the interior of a battery housing and thus inhibit degradation of the battery cell properties over time.

According to a first aspect of the invention, a method for manufacturing a battery cell is described which has at least the following method steps, preferably in the indicated sequence: a battery housing is provided into which then electrodes and an electrolyte are introduced. The method is characterized in that at least partial regions of a surface, in particular an outer surface, of the battery housing are coated with a diffusion barrier layer made of a polymer material and then the polymer material of the diffusion barrier layer is oxidized at least on the surface to form an oxide layer.

According to a second aspect of the invention, a battery cell is proposed which comprises a battery housing, electrodes accommodated in the battery housing, an electrolyte accommodated in the battery housing and a diffusion barrier layer made of a polymer material on a surface, in particular an outer surface, of the battery housing. The battery cell is characterized in that the diffusion barrier layer has a surface oxide layer generated by oxidation of the polymer material.

Ideas regarding embodiments of the present invention may be regarded, inter alia, as being based on the concepts and insights described below.

As noted in the introduction, it should be avoided in battery cells that oxygen reaches the interior of the battery cell surrounded by the battery housing and may react there chemically with the electrolyte or with material of the electrodes.

The battery housing itself conventionally consists of a material, such as for example a metal, which is tight with regard to penetration of oxygen, that is, in particular, through which oxygen cannot diffuse in significant quantities.

However, in the material of the battery housing there are typically local breaks, for example in the region of passage openings, through which connection terminals of the battery cell are passed from the interior coming through the battery housing to the outside. Also at seam points, joint points or the like, local breaks may exist in the battery housing. Such local breaks are mostly closed with a sealing material, often with a sealing material made of plastic, in order to seal the battery housing, for example, to penetration of moisture.

It has been observed that in particular in the region of local breaks in the battery housing, oxygen may reach the interior of the battery cell, since the plastic used as sealing material does not sufficiently inhibit inward diffusion of the oxygen.

It has been proposed to subsequently apply a diffusion barrier layer to regions of the battery housing which are critical with regard to this. It has been proposed concretely to subsequently deposit a layer of silicon dioxide, for example by means of gas-phase deposition, such as for example CVD (Chemical Vapor Deposition) or PVD (Physical Vapor Deposition). However, an additional step of deposition of a silicon dioxide layer requires considerable expense, since for example a gas-phase deposition process suitable for this should be carried out under vacuum.

The method put forward herein makes it possible to provide critical regions of a battery housing with a diffusion barrier layer in a manner which is technically simple to carry out.

In particular, the diffusion barrier layer may be applied, for example, to partial regions of the surface of the battery housing in which a material of the battery housing itself acting as a diffusion barrier to oxygen has local breaks. Concretely, the diffusion barrier layer may be applied, for example, adjacent partial regions of the battery housing, at which passage openings are provided in the battery housing, which are sealed, for example, by a material, in particular by plastic, which has a significantly lower barrier effect to diffusing oxygen than the material of the battery housing. Alternatively, the diffusion barrier layer may be applied over the entire surface of the battery housing.

The diffusion barrier layer may thus preferably be generated without technically expensive method steps, in particular without method steps in vacuum having to be carried out. In other words, the diffusion barrier layer may be formed with the aid of method steps which may all be carried out approximately at ambient pressure.

In order to generate the diffusion barrier layer, a layer made of a polymer material is applied to the partial regions of the surface of the battery housing to be protected. The polymer material may be a plastic which can be processed as liquid. The polymer material may be, for example, splashed on, sprayed on, poured on, printed on, spun on or applied in a different manner to the surface of the battery housing. Application of the polymer material may take place at ambient pressure, that is, without generating a negative pressure or vacuum.

The polymer material of the applied layer is then oxidized on the surface, that is, at least on its outwardly directed surface, up to a certain partial layer thickness. A layer of oxidized polymer material is thus formed on the surface of the applied layer.

It has been observed that such a layer of oxidized polymer material, which is designated herein also as oxide layer, is significantly more difficult for oxygen to penetrate than a layer of equal thickness of non-oxidized polymer material. The surface layer generated by oxidation thus increases the diffusion-inhibiting property of the diffusion barrier layer considerably.

This is particularly true if the polymer material of the diffusion barrier layer to be generated is silicone and a surface silicon dioxide layer is generated by oxidation.

Silicone, which is designated in some cases also as silicones or chemically more precisely poly(organo)siloxanes, is a designation for a group of synthetic polymers in which silicon atoms are linked via oxygen atoms. Molecular chains and/or molecular networks may occur. Remaining free valency electrons of the silicon are thus saturated by hydrocarbon radicals, mostly methyl groups. Silicones belong to the group of organo-silicon compounds. Due to their typically inorganic backbone on the one hand and the organic radicals on the other hand, silicones occupy an intermediate position between inorganic and organic compounds, in particular between silicates and organic polymers. They are to a certain extent hybrids and have a unique property spectrum. Silicone should not be confused with silicon.

Due to oxidation of an initially applied layer of silicone, a thin layer of silicon dioxide is formed on the outwardly directed surface of the silicone layer. Such a silicon dioxide layer acts particularly well as a diffusion barrier to penetration of oxygen. An effect as a diffusion barrier thus increases with increasing thickness of the silicon dioxide layer. However, thin silicon dioxide layers having a thickness of one or a few nanometers may also already significantly inhibit oxygen diffusion.

Oxidation of the polymer material, in particular of the silicone, may be effected by different processes. It should thus be strived for to use processes which can be simply converted to an industrial scale. For example it is possible to be striving to avoid methods which require vacuum process steps.

For example the polymer material may be oxidized by bringing it into contact with a plasma.

A plasma is an atomic-molecular particle mixture, which consists at least partly of charged components, such as ions and electrons, that is, which contains free charge carriers. A degree of ionization of a plasma may be less than 1%, but also up to 100% (complete ionization). Plasmas are suitable for treating materials on their surfaces, in particular in order to effect chemical reactions, such as for example oxidation, on the surfaces.

It may be advantageous for the present application if the plasma contains ionized oxygen. In other words, the atmosphere in which the plasma is generated may contain at least a significant proportion of oxygen. Oxygen ions from the plasma may then react with the polymer material and thus oxidize the latter. In particular, oxygen ions may react with silicon atoms from a silicone layer to form a silicon dioxide layer.

The plasma may thus preferably be generated as an atmospheric pressure plasma. An atmospheric pressure plasma, also designated as AP plasma or normal pressure plasma, may thus be understood to mean a special case of a plasma in which the pressure corresponds approximately to that of the surrounding atmosphere, that is, a so-called normal pressure of about 1000 hPa. Such an atmospheric pressure plasma may be generated technically simply and in particular without a necessity for having to provide a local vacuum.

Alternatively, the polymer material may be oxidized by bringing it into contact with a liquid which contains reactive oxygen.

For example the battery housing with its partial regions to be protected may be dipped into the liquid in a manner which is technically simple to carry out and be maintained until the required surface-oxidized polymer layer has been formed on the surface of the polymer layer applied there previously by chemical reaction with the reactive oxygen in the liquid.

In particular, a liquid may be used for this which contains hydrogen peroxide and/or an acid. Both hydrogen peroxide and many acids, in particular oxidizing acids, contain oxygen in a form in which the oxygen is very reactive and thus may preferably react with atoms or molecules from a polymer layer brought into contact therewith. Hydrogen peroxide or acids may be used in pure form or preferably in the form of a solution. Depending on the required oxidation effect, mineral acids and/or organic acids or also a mixture of acids may be used. For example a mixture of sulfuric acid ($H_2SO_4$) and hydrogen peroxide ($H_2O_2$), which is also called "piranha" acid, may be used.

As a further alternative, the polymer material may be oxidized by bringing it into contact with a gas atmosphere which contains reactive oxygen.

For example the battery housing provided previously with the diffusion barrier layer consisting of polymer material may be introduced into the reactive gas atmosphere in a manner which is technically simple to realize. The reactive oxygen in the gas atmosphere may then react with the surface of the polymer material, in particular with silicon atoms present there, chemically to form a surface oxide layer.

For example the gas atmosphere may contain ozone. Ozone, that is, 03, is a chemically reactive oxygen compound. The ozone in the gas atmosphere may be electrically neutral or ionized.

In particular for those previously described embodiments in which the polymer material is oxidized by bringing it into contact with a plasma or a gas atmosphere, the plasma or the gas atmosphere may have a pressure which is higher than an ambient pressure, and/or the plasma or the gas atmosphere may have a temperature which is higher than an ambient temperature.

By increasing the pressure and/or the temperature in the plasma or the gas atmosphere, the chemical reactivity thereof may be increased. An oxidation process may thus be accelerated. The pressure may be increased, for example compared to the ambient pressure, that is, with respect to a normal pressure of about 1000 hPa, only slightly, that is, for example, by 10%, 20% or 50%, or greatly, that is, for example, by 100%, 200% or 500%. Similarly, the temperature may be increased, for example compared to an ambient temperature of about 20° C., slightly, that is, for example, by 10° C., 20° C. or 50° C., or greatly, that is, for example, by 100° C., 200° C. or more.

According to one embodiment, the partial regions of the surface of the battery housing may be coated sequentially one after another respectively with a diffusion barrier partial layer made of a polymer material and after each coating with a diffusion barrier partial layer, the polymer material of the diffusion barrier partial layer may then be oxidized at least on the surface.

In other words, the diffusion barrier layer may be designed to be multilayered, that is, as a stack or multilayer of several diffusion barrier partial layers. Each of the diffusion barrier partial layers may thus be applied as a layer made of a polymer material, in particular silicone, thinly to a partial region to be protected and then may be oxidized on its surface. A next layer made of polymer material is then applied and oxidized on the surface, etc.

A multilayered diffusion barrier layer may thus have a higher diffusion barrier effect than a single diffusion barrier layer. In addition, it may be technically simpler, quicker and/or more cost-effective to generate several thin oxide layers on several polymer layers instead of generating a correspondingly thicker oxide layer on a single polymer layer.

Further layers made of polymer material or other materials may possibly be provided on the diffusion barrier layer. For example the previously surface-oxidized diffusion barrier layer may be protected mechanically and/or chemically by one or more further layers.

Embodiments of the battery cell according to the second aspect of the invention may advantageously be produced with the aid of the manufacturing method described herein.

The diffusion barrier layer provided at least in partial regions of the battery housing is thus characterized in that it has been generated by surface oxidation of polymer material. The oxide layer thus generated differs not only with regard to the manufacturing method used for its generation, but also structurally, from oxide layers which have been deposited, for example, by gas-phase deposition processes. In particular it is assumed that due to surface oxidation of the polymer material, chemical bonds between atoms or molecules in the non-oxidized polymer material are produced with atoms or molecules in the oxide layer generated by oxidation of the polymer material, whereas such chemical bonds may be lacking in subsequently deposited oxide layers or may be at least significantly more rare than for the oxide layers added on by oxidation. It may furthermore occur in oxide layers formed by oxidation that an $SiO_2$ gradient is formed. Hence, possibly no exact or concrete limit of $SiO_2$ and polymer exists. During oxidation, $SiO_2$ is formed on the surface; the proportion of $SiO_2$ is however lower in the sense of bulk. The battery cell and in particular the diffusion barrier layer thereof may thus have structural and/or functional properties which result from the manufacturing methods used for their production according to the embodiments described above.

It is pointed out that some of the possible features and advantages of the invention are described herein with reference to different embodiments in some cases of a method for manufacturing a battery cell and in some cases of a battery cell which can be thus manufactured. The features may be combined, transferred, adapted or interchanged in a suitable manner in order to reach further embodiments of the invention.

BRIEF DESCRIPTION OF THE DRAWINGS

Embodiments of the invention are described below with reference to the attached drawings, wherein neither the drawings nor the description are to be interpreted as restricting the invention.

The figures are only schematic and not true to scale. The same reference numbers designate in the figures the same or equal-acting features.

DETAILED DESCRIPTION

Figure 1:
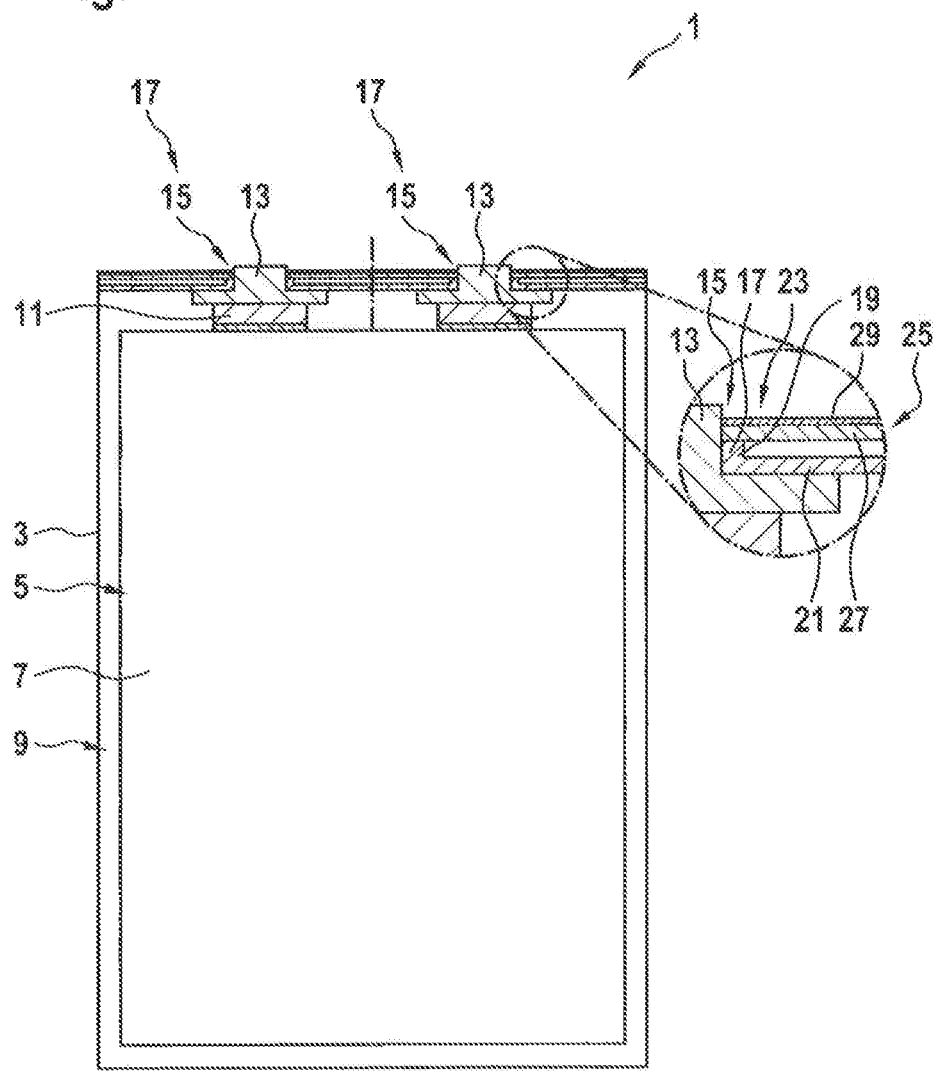
FIG. 1 shows a cross-section through a battery cell of the invention.

FIG. 1 shows one embodiment of a battery cell 1. The battery cell 1 comprises a battery housing 3. The battery housing 3 may have a rigid, for example prismatic shape. Alternatively, the battery housing 3 may also be formed by means of a flexible film in order to design the battery cell 1 as a pouch cell. Electrodes 5 of opposite polarity are accommodated in the battery housing 3, wherein the electrodes 5 may be piled up to form a stack 7. An electrolyte 9 is located between the electrodes 5. The electrodes 5 of opposite polarity are connected via lugs 11 to connection terminals 13 which respectively form a plus pole or a minus pole of the battery cell 1.

The connection terminals 13 project through passage openings 15 from the battery housing 3 to the outside. The passage openings 15 thus form local breaks 17 in the battery housing 3. A gap 19 in the region between an edge of one of the passage openings 15 in the battery housing 3 and a peripheral surface of a connection terminal 13 projecting through this passage opening 15 is thus hermetically closed by a seal 21. The seal 21 typically consists of a plastic. The seal 21 may additionally act adhesively in order to fix the connection terminal 13 to the battery housing 3.

Whereas the seal 21 is provided mainly to prevent penetration of moisture into the battery housing 3, the plastic used for the seal 21 for the most part cannot sufficiently inhibit inward diffusion of oxygen.

Figure 2:
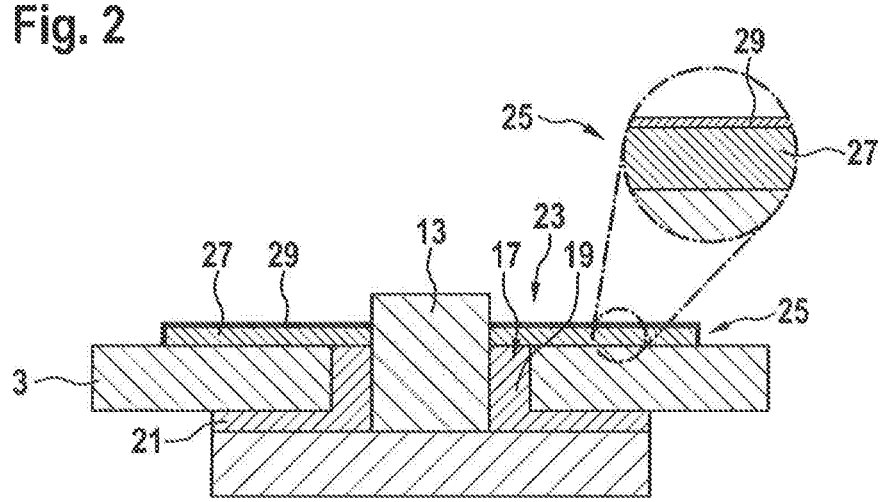
FIG. 2 shows an enlarged sectional view through a battery cell of the invention in the region of a connection terminal.
Figure 3:
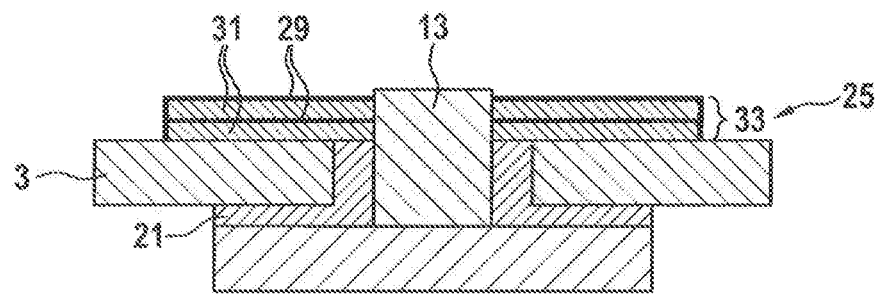
FIG. 3 shows an enlarged sectional view through an alternative battery cell of the invention in the region of a connection terminal.

As shown in FIG. 1 and by way of supplement in FIGS. 2 and 3 enlarged for two possible embodiments, a partial region 23 may be provided therefore by way of supplement with a diffusion barrier layer 25 adjacent the local breaks 17 in the battery housing 3.

The partial region 23 is thus coated with a layer made of polymer material 27. The polymer material 27 is preferably silicone or at least has silicone. The layer made of polymer material 27 is then oxidized specifically on its outwardly directed surface in order to form a thin oxide layer 29. In the event that silicone has been used as the polymer, this oxide layer 29 consists of silicon dioxide. Depending on under which conditions oxidation has been carried out, that is, for example, depending on how long the oxidizing process has been executed and/or at which temperature and/or which pressure this process has been carried out, the oxide layer 29 may have a thickness of about one or a few nanometers up to a few 100 nm. If the layer made of polymer material 27 has been applied extremely thinly, it may be oxidized under suitable conditions not only on the surface, but completely.

The surface oxidation of the layer made of polymer material 27 may be effected, for example, in that this layer is brought into contact with a reactive plasma. This plasma preferably contains ionized oxygen. The plasma may be generated as an atmospheric pressure plasma.

Alternatively, the layer made of polymer material 27 may also be oxidized on the surface in that it is brought into contact with a liquid or a gas atmosphere which contain reactive oxygen. For example the partial regions of the battery housing 3 to be protected with the layer made of polymer material 27 applied thereto may be dipped in hydrogen peroxide or an oxidizing acid or introduced into, for example, an ozone-containing oxidizing gas atmosphere.

An oxidizing process may last several minutes. However, the oxidizing process may be accelerated by suitable selection of process parameters, in particular by increasing a process temperature and/or, in the event that a gas atmosphere or a plasma are used, by increasing a process pressure. Process times of a few minutes or even a few seconds appear possible.

In the embodiment shown in FIG. 3, one after another several diffusion barrier partial layers 31 are deposited one above another like a stack in order to form in the end a multilayer diffusion barrier layer 33. One, several or all diffusion barrier partial layers 31 may be oxidized on the surface after deposition in order to form an oxide layer 29 before a next diffusion barrier partial layer 31 is then deposited.

The manufacturing method put forward herein or the battery cell 1 to be manufactured therewith facilitate reliable inhibition of inward diffusion of oxygen into the interior of the battery cell surrounded by the battery housing 3 and facilitate generation of a diffusion barrier layer 25 serving therefor using means which are technically simple and can be implemented on an industrial scale. The diffusion barrier layer 25 may thus lower, for example, a permeability of oxygen, which without such a layer typically lies in the range from a few hundred barrer, to mostly significantly below 100 barrer, often even significantly below 10 barrer. A permeability for carbon dioxide may be lowered to a similar extent.

Finally, it should be pointed out that terms like "having", "comprising", etc. do not exclude other elements or steps and terms like "one" do not exclude a plurality. Reference numbers in the claims are not to be regarded as a restriction.

The invention claimed is:

1. A method for manufacturing a battery cell, the method comprising:
   providing a battery housing;
   introducing electrodes and an electrolyte into the battery housing wherein each electrode is electrically connected to one of two terminals that extend through the battery housing;
   coating at least partial regions of a surface of the battery housing and a surface of each terminal with a diffusion barrier layer made of a polymer material, and
   thereafter oxidizing the polymer material of the diffusion barrier layer at least on the surface to form an oxide layer,
   wherein the polymer material is silicone and wherein a surface silicon dioxide layer having a thickness of at least 1 nanometer is generated by oxidation.

2. The method according to claim 1, wherein the polymer material is oxidized by bringing the polymer material into contact with a plasma.

3. The method according to claim 2, wherein the plasma contains ionized oxygen.

4. The method according to claim 2, wherein the plasma is generated as an atmospheric pressure plasma.

5. The method according to claim 2, wherein the plasma has a pressure which is higher than an ambient pressure, and wherein the plasma has a temperature which is higher than an ambient temperature.

6. The method according to claim 2, wherein the plasma has a pressure which is higher than an ambient pressure.

7. The method according to claim 2, wherein the plasma has a temperature which is higher than an ambient temperature.

8. The method according to claim 1, wherein the polymer material is oxidized by bringing the polymer material into contact with a liquid which contains reactive oxygen.

9. The method according to claim 8, wherein the liquid contains hydrogen peroxide and/or an acid.

10. The method according to claim 1, wherein the polymer material is oxidized by bringing the polymer material into contact with a gas atmosphere which contains reactive oxygen.

11. The method according to claim 10, wherein the gas atmosphere contains ozone.

12. The method according to claim 10, wherein the gas atmosphere has a pressure which is higher than an ambient pressure, and wherein the gas atmosphere has a temperature which is higher than an ambient temperature.

13. The method according to claim 10, wherein the gas atmosphere has a pressure which is higher than an ambient pressure.

14. The method according to claim 10, wherein the gas atmosphere has a temperature which is higher than an ambient temperature.

15. The method according to claim 1, wherein the partial regions of the surface of the battery housing and the surface of each terminal are coated sequentially one after another respectively with the diffusion barrier partial layer made of the polymer material and after each coating with the diffusion barrier partial layer, the polymer material of the diffusion barrier partial layer is then oxidized at least on the surface.

16. The method according to claim 1, wherein the partial regions of the surface of the battery housing and the surface of each terminal are coated with the diffusion barrier layer, in which partial regions a material of the battery housing acting as a diffusion barrier to oxygen has local breaks between the battery housing and each terminal.

17. A battery cell, comprising:
   a battery housing;
   electrodes accommodated in the battery housing;
   an electrolyte accommodated in the battery housing;
   two terminals, each individual electrode is electrically connected to one of the two terminals, each terminal extending through the battery housing: and
   a diffusion barrier layer made of a silicone on a surface of the battery housing and a surface of each terminal;
   wherein the diffusion barrier layer has a surface silicon dioxide layer having a thickness of at least 1 nanometer generated by oxidation of the silicone.

* * * * *